United States Patent [19]
Payne et al.

[11] 3,836,845
[45] Sept. 17, 1974

[54] APPARATUS FOR TESTING THE LINEARITY OF A CIRCUIT BY USING RATIO DETERMINING MEANS

[75] Inventors: Michael Ian Payne, Dunellen; James Dimitri Mazgy, Parsippany, both of N.J.

[73] Assignee: RCA Corporation, New York, N.Y.

[22] Filed: Aug. 3, 1973

[21] Appl. No.: 385,299

[52] U.S. Cl............................................ 324/57 PS
[51] Int. Cl........................................... G01r 27/00
[58] Field of Search ............... 324/57 PS, 57 R, 132

[56] References Cited
UNITED STATES PATENTS

| | | | |
|---|---|---|---|
| 2,646,545 | 7/1953 | King, Jr............................ | 324/57 PI |
| 2,874,280 | 2/1959 | McCulley......................... | 324/57 PI |
| 3,271,678 | 9/1966 | Daly et al......................... | 324/57 PI |

Primary Examiner—Stanley T. Krawczewicz
Attorney, Agent, or Firm—Edward J. Norton; William Squire

[57] ABSTRACT

Apparatus for testing the linearity of a circuit includes means for applying a staircase waveform to the circuit under test. The staircase waveform has known ratios between the values of one step and the remaining steps. The staircase waveform as altered by the circuit under test has unknown ratios between the one altered step and the remaining altered steps. Means are provided for determining the ratios of the one step to the remaining steps of the altered staircase waveform and for comparing these ratios to the known ratios existing in the original waveform. The difference between these ratios, if any, is determined and provides by way of a ratio comparator an indication of the linearity of the circuit under test.

13 Claims, 3 Drawing Figures

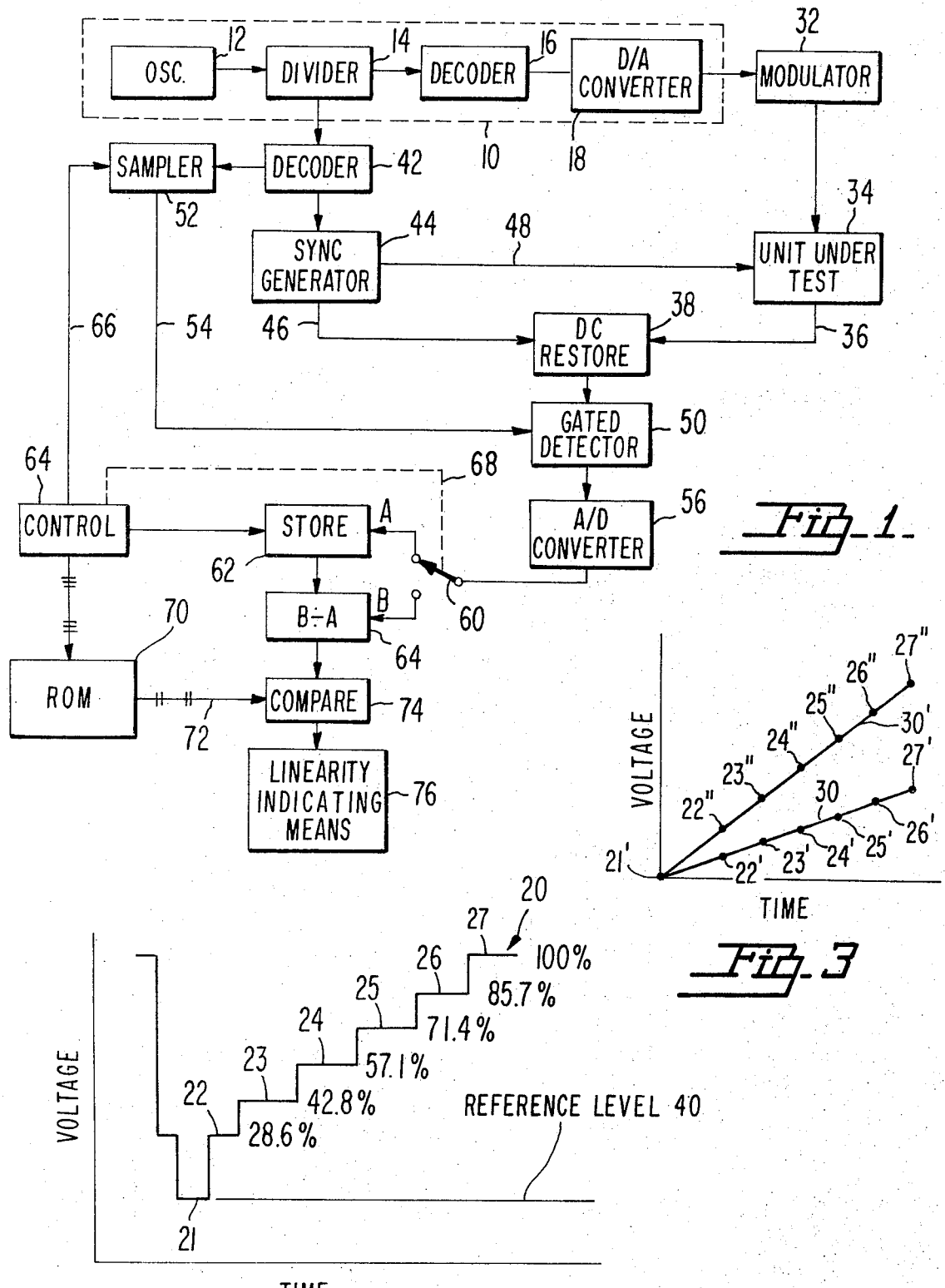
Fig. 1
Fig. 3
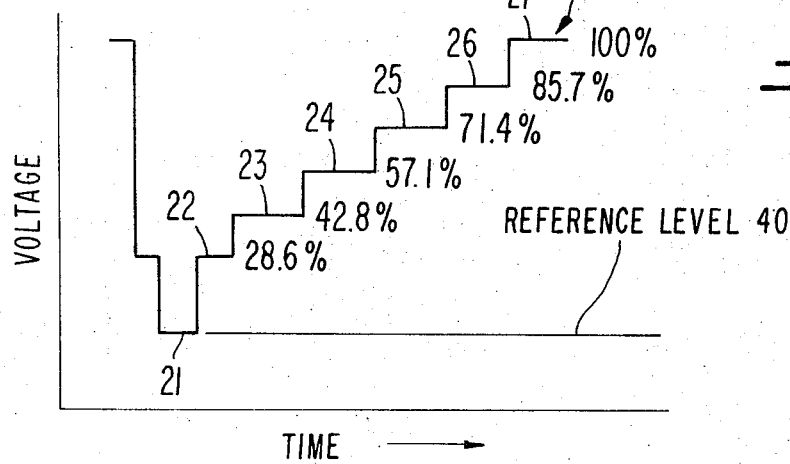
Fig. 2

APPARATUS FOR TESTING THE LINEARITY OF A CIRCUIT BY USING RATIO DETERMINING MEANS

BACKGROUND OF THE INVENTION

The present invention relates to apparatus for testing a circuit for linearity. In the past, to test a circuit for linearity, the test signal has been applied as the non-inverting input to an operational amplifier and to a circuit under test. The output of the circuit under test, altered in accordance with the linearity of the circuit under test, is applied to the inverting input of the operational amplifier. A feedback network is provided between the circuit output and the inverting input of the amplifier. As a result, any variation in linearity of the circuit under test will cause a corresponding variation in the amplitude of the output signal provided by the operational amplifier which is measured and thus provides a linearity indication.

Such an approach is unsatisfactory to test linearity in circuits in which the gain of the circuit varies in an unknown manner. With variations in gain, the slope of the signal processed by the circuit under test will vary proportionally with the gain causing a false linearity test. These variations in slope appear to the test circuit as a difference in linearity, which in fact, is not the case.

If the output of the circuit under test varies in gain as well as in linearity, then means must be provided in the linearity test circuit to compensate for and adjust for the variations in gain. The addition of such means to the test circuit is difficult and complex, particularly, when the gain characteristics are unknown.

One particular circuit to which a linearity test system is applicable is a television receiver IF circuit. This circuit is usually tested by applying a staircase waveform thereto and then examining the output thereof of an oscilloscope in an effort to determine the linearity of the circuit. Since such a circuit varies in an unknown manner in gain without affecting the linearity thereof, such testing has been difficult and not without inherent problems in achieving reliable and repetitive test results. Utilization of previously known linearity test circuits of the type described above for such a circuit is unsatisfactory due to the gain problem noted.

SUMMARY OF THE INVENTION

In accordance with the present invention, an apparatus is provided for measuring the linearity of a circuit comprising means for generating a waveform having first and second values exhibiting a given ratio therebetween. Means are provided for applying the waveform to the circuit under test, the circuit under test altering the values of the waveform in accordance with the linearity of that circuit. The altered values exhibit an unknown ratio therebetween proportional to the given ratio. Means are provided which are responsive to the generated waveform and the altered waveform for determining the given and unknown ratios and for comparing the given ratio to the unknown ratio to provide an an output thereof a signal manifesting the difference between the ratios, the difference in ratios indicating the linearity of the circuit.

IN THE DRAWING

FIG. 1 is a block diagram schematically illustrating an apparatus constructed in accordance with the present invention.

FIGS. 2 and 3 are graphs of various waveforms useful in illustrating the principles of the present invention.

DETAILED DESCRIPTION

Staircase waveform generator 10 includes an oscillator 12, a divider 14, a decoder 16, a digital-to-analogue converter 18. The generator 10 provides a staircase waveform 20 of FIG. 2 useful in testing the linearity of the picture IF circuit in a television receiver, by way of example.

Staircase waveform 20 has a plurality of steps 21 through 27 and is of the type which meets television industry requirements known as an (EIA) Electronic Industry Associates staircase which the circuit of the television receiver under test must process in accordance with established linearity standards. Oscillator 12, divider 14, decoder 16 and digital-to-analogue converter 18 are each in themselves conventional components which precisely generate waveform 20 to the predetermined known staircase requirements. Each of the steps 22 through 27 of waveform 20 is provided that amplitude which provides a predetermined percentage of the maximum amplitude between step 21, having a minimum reference value, and step 27, having a maximum value.

The amplitude of the steps are assigned arbitrary units known as EIA units. Step 22 is 40 units above step 21. All of the remaining steps are separated from the adjacent steps by 20 units. The maximum value of step 27 is taken as 100 percent, with the remaining steps having a value which is a known percentage of the value of step 27, as illustrated in FIG. 2. Thus, step 26 has an amplitude above the reference level (manifested by step 21) of 85.7 percent of the value of the amplitude of step 27 above step 21. Step 25 has a value which is 71.4 percent, step 24 57.1 percent, step 23 42.8 percent and step 22 28.6 percent above the value of the reference level of step 21.

The values of the amplitude of each of the steps 22 to 27 above the reference level can be shown to represent the value of corresponding respective points 21' to 27' on straight line 30 of FIG. 3. In FIG. 3, the points having the same numerals as the steps of FIG. 2, but primed and double primed correspond to the steps having the same numerals in waveform 20. The magnitudes of the ratio of the values of steps 22 to 26 to the values of step 27 is known a priori by the test apparatus constructed in accordance with the present invention.

Waveform 20 is applied to modulator 32 of FIG. 1 which modulates waveform 20 at a suitable frequency for processing by the picture IF circuit in the unit under test 34. Unit under test 34 demodulates the modulated staircase waveform 20 at output 36 thereof. Demodulated waveform 20 is altered in accordance with the linearity and gain of the unit under test 34.

However, as is known, the picture IF circuit in conventional television receivers may have an unknown gain which varies in amplitude from one receiver to the next, and is immaterial to the linearity requirements established for this circuit. Compensation must be provided for such variation in gain, otherwise, error will appear in the linearity test results.

In FIG. 3, assume waveform 30 is the waveform of a test signal. Should the circuit of the unit under test 34 vary in gain, but not in linearity, then it is possible for the slope of waveform 30 to be altered by the circuit under test as illustrated by waveform 30'. As provided by the apparatus described herein, no gain compensation circuit is necessary, yet a simple and accurate linearity test circuit is provided regardless of the differences in gain that affect the waveform 30.

The ratio between the amplitude of waveform 30 at points 21', 22', 23', 24', 25' and 26' to the value of the amplitude of waveform 30 at 27' corresponding respectively to steps 22 to 27, inclusive, of waveform 20, FIG. 2, will not change when the slope of waveform 30 shifts to a value as represented by waveform 30', points 21' and 22'' through 27''. The ratio of the values of points 22'' through 26'' to the value of point 27'' which occur in time coincidence with the respective points 22' to 27' will be the same regardless of the variation in slope between the waveforms 30' and 30, providing that the waveform 30' remains a straight line. Once the waveform 30' varies from a straight line, then ratios of the values of points 22' to 27' as compared to points 22'' to 27'' will be different in accordance with the non-linearity, and this difference can be calibrated to manifest the non-linearity of the circuit under test.

To accomplish this objective the altered waveform 20 appearing at output 36 of the unit under test 34 is applied to a suitable DC restore circuit 38. The DC restore circuit 38 is a conventional circuit which serves to establish reference level 40 at step 21, FIG. 2. The timing of the reference level is established by a timing circuit including oscillator 12, divider 14, decoder 42 and sync generator 44 which serves to derive timing pulses at output 46 of sync generator 44. These timing pulses trigger DC restore circuit 38 in time coincidence with step 21. Oscillator 12 serves as a clock for both the generation of waveform 20 and the DC restore trigger pulses.

Sync generator 44 also generates a timing signal at output 48. The signal on output 48 is applied to unit under test 34, e.g., a picture IF circuit in a conventional television receiver to gate the AGC of that circuit on and off at TV line rate to simulate the effect of actual reception.

The output of DC restore circuit 38 is a DC reference signal represented by waveform 20 altered by unit under test 34 in which signal each of the steps are referenced to reference level 40. This referenced altered waveform 20 is applied to gated detector circuit 50. Gated detector circuit 50 is a circuit which serves to sample each of the steps 22 through 27 in the altered waveform and provide as an output a DC signal whose amplitude represents the amplitude of each of these steps. The gated detector is triggered by a suitable signal provided by sampler 52 which signal occurs in time coincidence with each of steps 22 to 27. Sampler 52 is driven from decoder 42 which decodes the output of divider 14. The decoded output of decoder 42 applied to sampler 52 causes sampler 52 to generate sampling signals along lead 54 which, in turn, cause gated detector 50 to pass samples of each of steps 22 to 27.

The samples gated by detector 50 occur in given time intervals. These time intervals are such that they each coincide with a different respective corresponding step 22 to 27. Since these time intervals relate to the waveform 20 generated by the apparatus, the time intervals are independent of the circuit under test, assuming negligible delay in the circuits under test. As a result, the particular unit under test 34, regardless of its gain factor, may be plugged into the system between modulator 32 and DC restore 38 and automatically tested for linearity, in a manner to be described, without any adjustment to the linearity test apparatus.

The gated samples provided at the output of detector 50 are applied to a suitable analogue-to-digital converter 56. Converter 56 converts the DC level of each of the output signals from detector 50 to a suitable digital signal representing in encoded digital form the DC level of the detector 50 output.

The digital output signal of converter 56 is selectively applied by switch 60 to a suitable digital store circuit 62, or, in the alternative, to a suitable digital divider circuit 64. Switch 60 is controlled by a master control 64 along dotted line 68 provided by a conventional computer or the like. Control 64 also controls by way of a signal along lead 66 the sampling timing of the signal generated by sampler 52.

Control 64 by means of a preprogammed circuit provided therein, such a circuit being within the skills of one skilled in the computer art, places switch 60 in the position shown in FIG. 1 to connect the store 62 to analogue-to-digital converter 56 in time coincidence with the occurrence of step 27 of FIG. 2. The digital signal representing the value of step 27 is applied to store 62 and stored thereby until utilization by divider 64. Switch 60 is positioned to connect divider 64 to analogue-to-digital converter 56 in time coincidence with the selected ones of steps 22 to 26.

For purposes of illustration, the value of step 27 is represented as A, as noted in FIG. 1, which value is the maximum value of waveform 20. The value of each of the other steps 22 through 26 is represented as B as also indicated in FIG. 1. Divider 64 serves to divide the value of signal B by the value of signal A. This provides the percentage ratio of the value of each of the steps 22 to 26 to the value of the step 27 in digital form. These percentages are arbitrarily chosen for purposes of illustration as 28.6, 42.8, 57.1 71.4 and 85.7 percent, as indicated in FIG. 2. It will therefore be appreciated that the unaltered waveform 20 applied to the unit under test 34 has steps 22 to 26 whose amplitude is a known percentage of the amplitude of the maximum step 27.

When a circuit under test 34 varies the applied staircase waveform 20 in gain, as manifested by waveform 30' of FIG. 3, the ratios of the values of each of steps 22'' through 26'' to the value of step 27'' as altered by the circuit under test remains the same. A signal manifesting these ratios may be provided by a suitable read only memory (ROM) 70. The ROM 70 is a device arranged to generate on output 72 a digital signal which occurs in time coincidence with the corresponding digital output signal of divider 64. ROM 70, in accordance with timing signals provided by control 64, produces a digital encoded signal which manifests a ratio reference value to which the output of divider 64 is to be compared. This ratio reference value represents the corresponding ratio of the B signal to the A signal for each of steps 22 through 26 to step 27.

In accordance with established practice in the computer art, each ratio reference value may be provided in terms of a tolerance range, each range having an upper and lower limit. Thus, the ratio of each step 22 through 26 to step 27 may be provided in terms of a pair of ratios. The upper and lower limit reference values for each range are timed by control 64 to occur in time coincidence with the corresponding B/A ratio then being provided by divider 64.

The two respective signals provided by divider 64 and ROM 70 are compared by comparator 74 which is a suitable circuit for comparing the digital encoded value of the two signals. Comparator 74 provides an output signal whose value indicates the linearity of the unit under test 34. When the values of the signals provided by divider 64 and ROM 70 are within the given predetermined tolerance range, comparator 74 provides a signal to linearity indicating means 76 which means indicates whether or not the unit under test 34 is linear within the test limits.

Further, means can be provided (not shown) for indicating that portion of the waveform 20 which is nonlinear. Additional suitable go, no-go means may be included as part of the indicating means 76 to indicate whether the circuit of the test is good or bad rather than the degree of non-linearity. Further utilization means, not shown, to provide related linearity test indications may also be included with the indicating means 76 in accordance with a particular test circuit requirement.

In an operative embodiment constructed in accordance with the present invention, oscillator 12 is a 1 MHz oscillator, divider 14 is a divide-by-64 divider and provides the line rate for the television receiver circuit to be tested. Modulator 32 is a 45 MHz modulator which provides the carrier signal suitable for a picture IF integrated circuit present in a conventional television receiver. Such a television receiver circuit demodulates the modulated signal to produce the demodulated staircase waveform on lead 36.

Thus, as provided in accordance with the present invention, the apparatus compares percentage difference in amplitude of a signal altered by a circuit under test with percentage difference of the same portions of the waveform unaltered by the circuit under test. Any difference between the percentage difference in amplitudes of the two signals represents a variation of linearity in the circuit under test regardless of any unknown gain factor in that circuit. Therefore, no adjustment need be made in the apparatus to compensate for individual circuits under test which may differ in characteristics with respect to gain from one unit to another. By providing computer control, such circuits under test may be tested reliably, quickly and without adjustment. As a result, a reduction of complexity and operating cost make such a test apparatus suitable for production of television receiver picture IF circuits.

It is to be understood that the illustrated embodiment of a picture IF circuit in a television receiver is to be considered as an example of the type of circuit which the apparatus of the present invention will test. In practice, other circuits having unknown gain factors and linearity may be utilized with an apparatus constructed and operated in accordance with the present invention.

What is claimed is:

1. An apparatus for measuring the linearity of a circuit, comprising:
   waveform generating means for generating a staircase waveform having a plurality of sequentially occurring step transitions, the waveform occurring intermediate each pair of adjacent step transitions having a known value different from the value of the waveform occurring intermediate the other adjacent step transitions, the ratio of a given one of said values to each of the other of said values being known a priori,
   means for applying said staircase waveform to said circuit, said circuit tending to alter the applied waveform in accordance with the linearity and gain of said circuit to produce as an output signal an altered staircase waveform, said altered staircase waveform exhibiting a plurality of step transitions each corresponding to a different one of said sequentially occurring step transitions, and
   means for determining the ratio of a certain one of said values of said altered waveform to each of the other of said altered waveform values corresponding to those values forming said known ratios and for comparing the determined ratios to said known ratios to thereby produce a linearity output signal manifesting the difference between said ratios, which difference manifests the linearity of said circuit.

2. An apparatus for measuring the linearity of a circuit comprising:
   means for generating a first signal having first and second values, said first and second values having a given ratio therebetween,
   input means for applying said first signal to said circuit to thereby produce a second signal having respective third and fourth values corresponding to said first and second values, said third and fourth values tending to be different than said first and second values in accordance with the linearity and gain of said circuit,
   means responsive to said second signal for generating an output signal manifesting the ratio between said third and fourth values,
   means for generating a ratio reference signal manifesting said given ratio, and
   linearity measuring means responsive to said output signal and reference signal applied as respective inputs thereto for comparing the given ratio to said generated ratio and providing a signal indicating the difference between said ratios, which difference manifests the linearity of said circuit.

3. An apparatus for measuring the linearity of a circuit, comprising:
   means for generating a waveform having first and second values exhibiting a given ratio therebetween,
   means for generating a ratio reference signal manifesting said given ratio,
   means for applying said waveform to said circuit, said circuit tending to alter the values of said waveform in accordance with the linearity and gain of said circuit,
   means responsive to said altered waveform applied as an input thereof for determining the ratio between said altered first and second values, sand
   means responsive to said generated ratio reference signal and to the operation of said ratio determining means for comparing the given ratio to said determined ratio to provide as an output thereof a signal manifesting the difference between said ratios, said difference in ratios indicating the linearity of said circuit.

4. An apparatus for measuring the linearity of a circuit, comprising:
means for generating a waveform having first and second values exhibiting a given ratio therebetween,
means for applying said waveform to said cricuit, said circuit tending to alter the values of said waveform in accordance with the linearity of said circuit, said altered values exhibiting an unknown ratio therebetween, and
means responsive to said generated waveform and said altered waveform for determining said given and unknown ratios and for comparing said given ratio to said unknown ratio to provide as an output thereof a signal manifesting the difference between said ratios, said difference in ratios indicating the linearity of said circuit.

5. The apparatus of claim 4 wherein said circuit is the picture IF circuit in a television receiver and said generated waveform is a modulated staircase wave form.

6. The apparatus of claim 4 wherein said last-mentioned means includes sampling means for sampling said generated waveform in the time intervals occurring in time coincidence with said first and second values to provide a plurality of sample signals, and means responsive to said sample signals for dividing the value of one of said samples by the value of the other of said samples to provide said unknown ratio.

7. The apparatus of claim 4 wherein said last-mentioned means includes means for generating a ratio reference signal manifesting said given ratio.

8. In combination:
a staircase waveform generator,
means for applying said staircase waveform to a circuit under test to produce a staircase waveform tending to be altered by said circuit,
means for establishing a reference level in said altered waveform,
means for sampling selected ones of the steps in said altered waveform,
means for dividing the value of one of said selected steps by the value of another of said selected steps to provide a signal manifesting an unknown ratio therebetween,
means for generating a ratio reference signal manifesting the known ratio between the generated staircase waveform steps corresponding to said one and other selected steps, and
means for comparing said known and unknown ratios to generate a signal indicating the linearity of said circuit in accordance with the difference in value between said known and unknown ratios.

9. The combination of claim 8 wherein said staircase waveform has a plurality of steps each spaced a different value with respect to said reference level.

10. The apparatus of claim 9 wherein said one selected step is that step having a maximum value with respect to said reference level, said dividing means dividing the value of said one step by the value of each of the other steps.

11. The apparatus of claim 8 wherein said sampling means includes means for sequentially sampling each of said selected steps.

12. The apparatus of claim 8 further including control means for causing said dividing means to synchronously generate said unknown ratio signal with said known ratio signal.

13. In combination:
means for generating a test signal having a known ratio between the value of a first portion thereof and a second portion thereof,
means for applying said test signal to a circuit under test, said circuit tending to alter said test signal in an unknown manner,
means for comparing the value of a first portion of said altered signal corresponding to said test signal first portion to a second portion of said altered signal corresponding to said test signal second protion to generate a signal manifesting an unknown ratio between said first and second portions of said altered signal, and
means for comparing said known and unknown ratios to generate a signal indicating the magnitude of the differnece therebetween, said magnitude manifesting the linearity of said circuit.

* * * * *

UNITED STATES PATENT OFFICE
CERTIFICATE OF CORRECTION

Patent No. 3,836,845　　　　　Dated September 17, 1974

Inventor(s) Michael Ian Payne & James Dimitri Mazgy

It is certified that error appears in the above-identified patent and that said Letters Patent are hereby corrected as shown below:

Column 6, Claim 3, Line 59: Change "thereof" to read -- thereto --,

Column 6, Claim 3, Line 60: Change "sand" to read -- and --.

Signed and sealed this 3rd day of December 1974.

(SEAL)
Attest:

McCOY M. GIBSON JR.
Attesting Officer

C. MARSHALL DANN
Commissioner of Patents